Nov. 27, 1934.  J. F. DUBY  1,982,377
VEHICLE WHEEL
Filed April 14, 1932  3 Sheets-Sheet 1

Inventor:
John F Duby

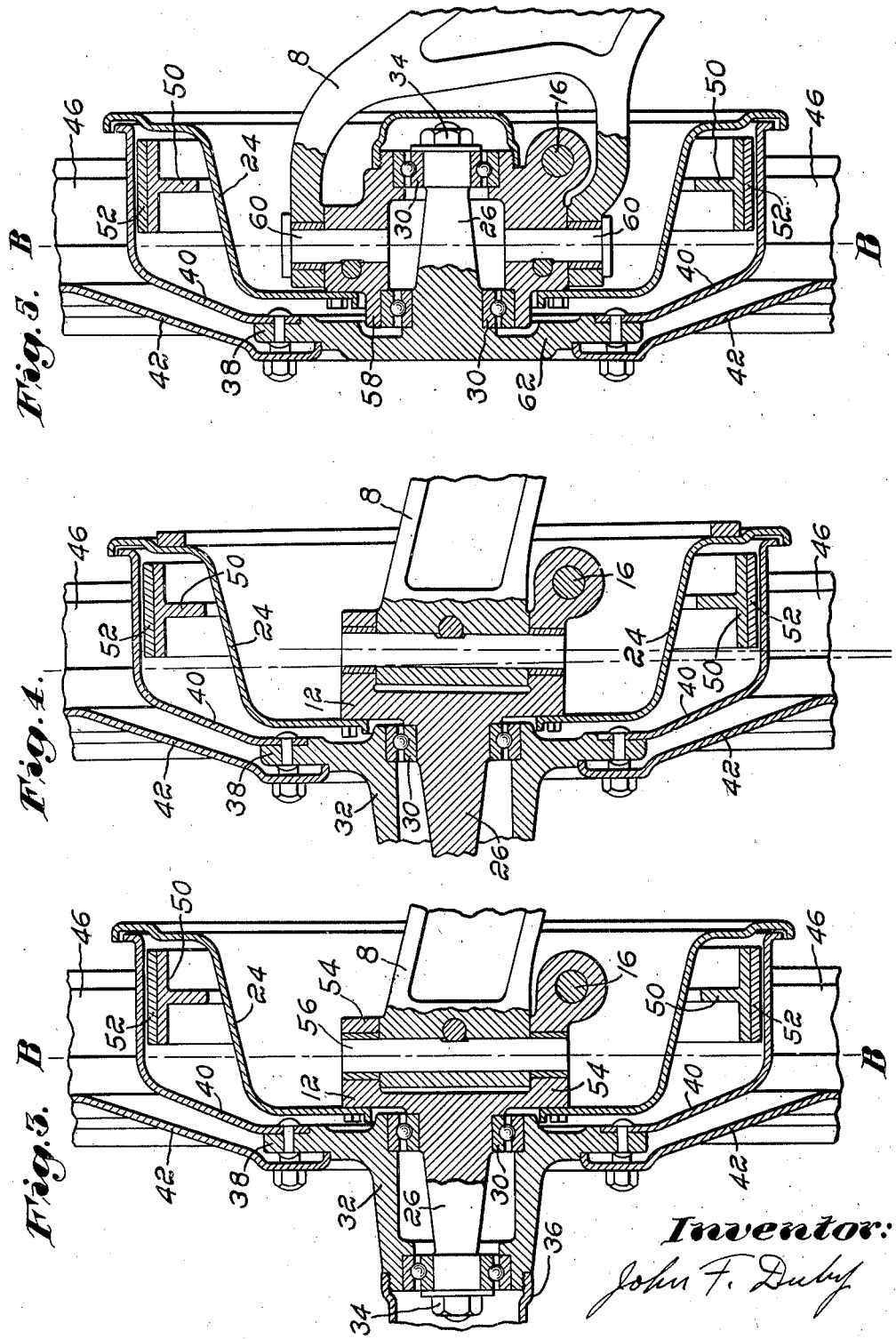

Patented Nov. 27, 1934

1,982,377

UNITED STATES PATENT OFFICE 1,982,377

VEHICLE WHEEL

John Fabien Duby, Boston, Mass.

Application April 14, 1932, Serial No. 605,222

14 Claims. (Cl. 280—96.3)

My invention relates to vehicle wheels, the method of mounting thereof and more particularly to the dirigible units of a motor vehicle.

One of the objects of my invention is to provide a unit of this type having a king-bolt connection to an axle tree, the axes of said bolt lying in a common vertical plane with the center of gravity of the unit. Another object is to arrange the various parts of a wheel, and certain parts of its cooperating members, in such a manner that the center of gravity of the entire unit will lie in substantially the same vertical plane as the king-bolt axis and the middle of tire tread. Other objects will be apparent from the following description taken in connection with the accompanying drawings in which:

Figs. 3, 4 and 5 are vertical cross sections of a wheel representing modified forms of knuckle design and their axle tree connections.

Figure 6:
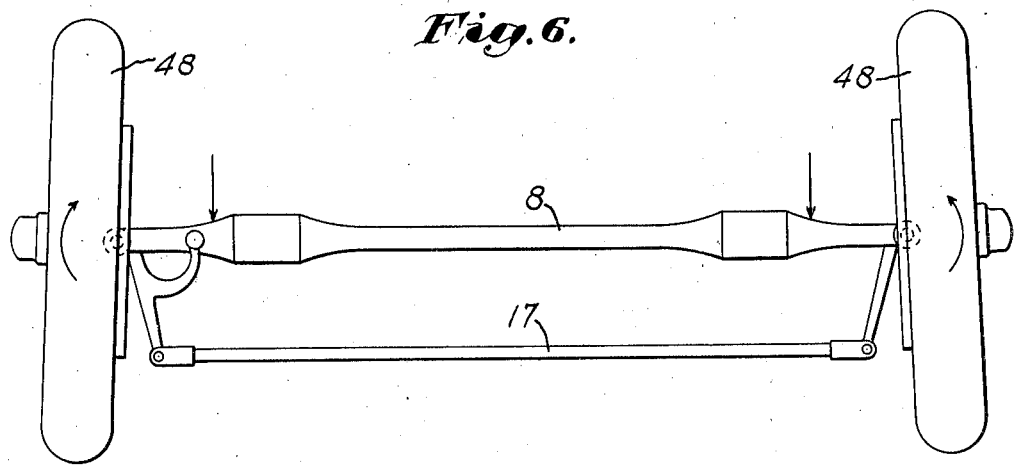
Figs. 6 and 7 are skeleton views of an axle assembly representing respectively the old method and my improved method of construction.

Heretofore the practice has been to construct and assemble an axle and its dirigible units substantially as shown in Fig. 6 wherein the king pin axis is positioned a considerable distance away from the center of gravity, with respect to the wheel and its associated knuckle member as a unit. I have discovered that the foregoing construction is responsible, to a considerable degree, for vibratory actions of the wheels, more commonly known as "shimmy". These vibratory actions occur when the forward motion of a vehicle is disturbed by some condition which tends to decelerate the forward motion of the vehicle and is equivalent to a retarding force applied to the axle as indicated by the arrows in Fig. 6. The tendency of each unit is to continue its forward motion, whereupon it will attempt to swing around its king-pin axis as indicated by the arrows; their movements are in opposite directions and are limited by the tie-rod; hence, transverse vibrations are built up between the wheels as each one strives to regain its normal straight ahead position.

Figure 7:
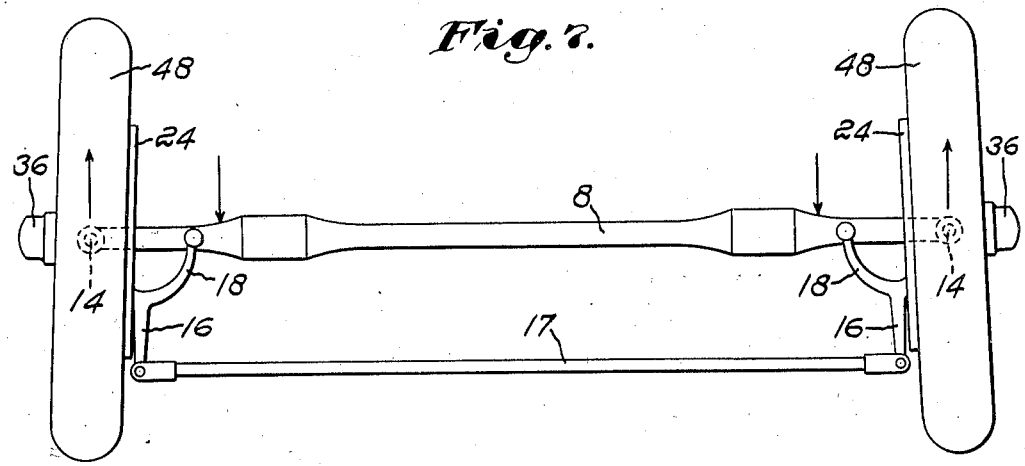

With my improved construction, when a retarding force is applied to the axle as indicated by the arrows in Fig. 7 there will be no tendency of the wheel unit to swing about the axis of its king-pin because said axis lies in a vertical plane which also contains the wheel unit center of gravity; therefore, the unit will not be affected by changes of vehicle velocity but will maintain its normal straight ahead position. This construction not only provides for equal distribution of the ordinary road resistance active upon the king pin, but in addition thereto, it provides means to control the inertia forces which, when uncontrolled, tend to turn the dirigible unit about the king pin as an axis when changes occur in the velocity of the vehicle. As each unit is of identical construction description of one is deemed sufficient.

Figure 1:
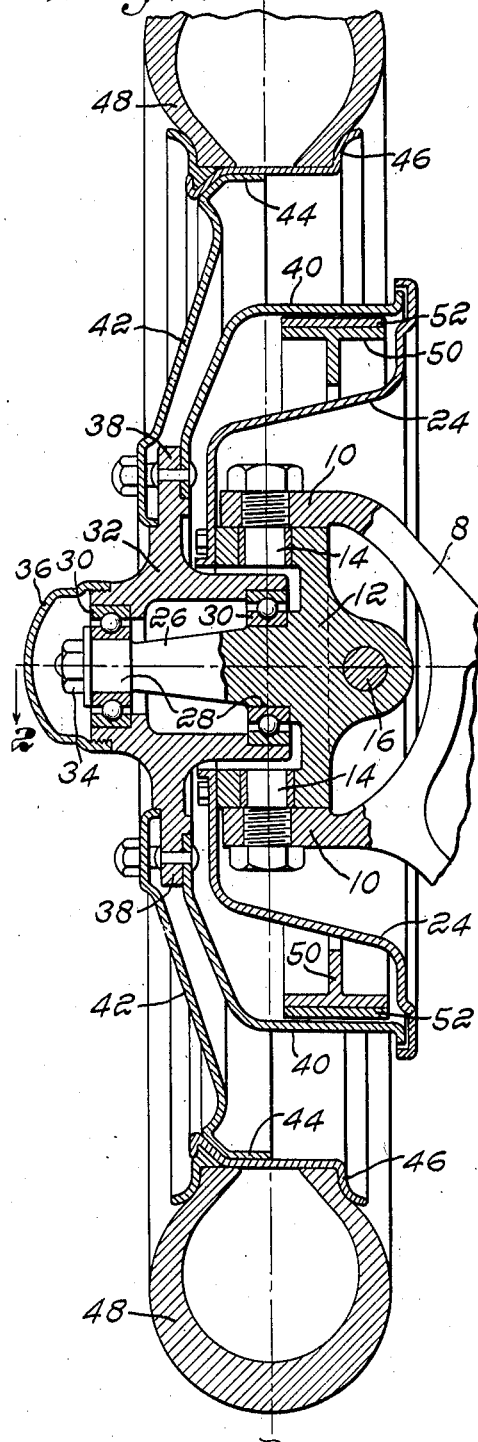
Figure 1 is a vertical cross section of a wheel incorporating a preferred embodiment of my invention for purposes of illustration.
Figure 2:
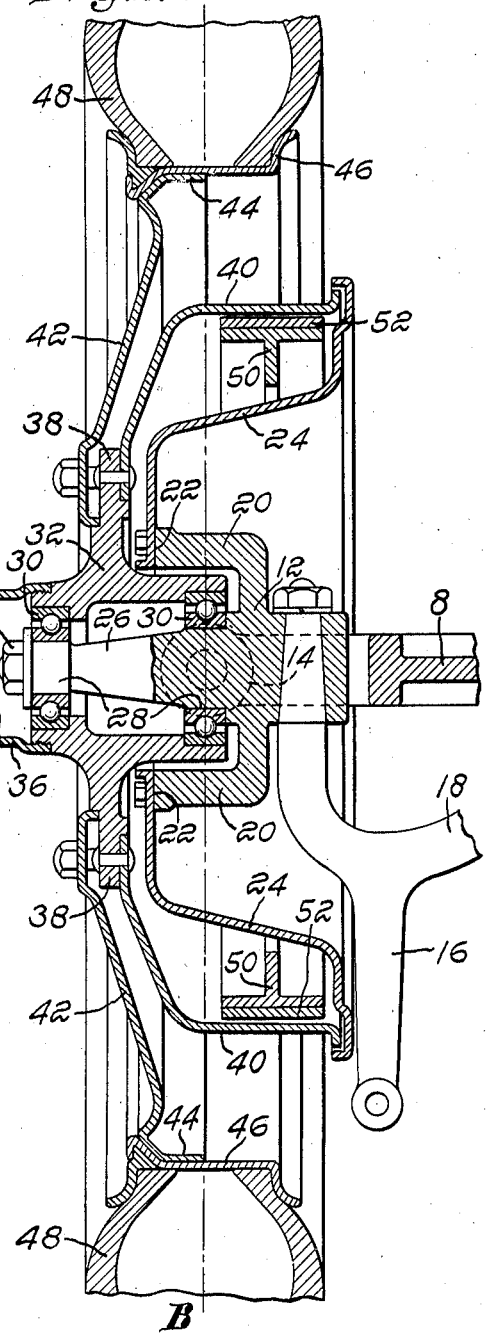
Fig. 2 is a horizontal plan section thereof taken on line 2—2 of Fig. 1.

Referring now to Figs. 1 and 2, I have represented an axle tree 8 having knuckle supporting portions 10 adapted to receive a steering knuckle 12. Pivotal connection between each knuckle and portions 10 of the axle may comprise a pair of knuckle pins 14, the axes of the latter lying in a common plane and adapted to allow movement of the knuckle for steering purposes. Steering arms 16 may be suitably attached to the inner portion of the knuckle 12, Fig. 2, said arms having an extension 18 adapted for connection to the usual drag-link and steering wheel, not shown. The outer ends of arms 16 are adapted for connection to the conventional tie rod 17, Fig. 8.

The knuckle 12 may comprise a cup-shaped portion 20, Fig. 2, adapted to present an annular face 22 forming a supporting surface for the cover plate 24 which may be attached thereto in any suitable manner. A wheel spindle 26 of the knuckle 12 may be provided with bearing receiving surfaces 28, the inner one of which may be substantially central with respect to the king pin axis, as shown. Suitable bearings 30 may be interposed between the surfaces 28 and a wheel hub 32, in the usual manner, the latter being held in position thereon by a nut 34 which may be covered by a hub cap 36.

The hub 32 may have an annular flange portion 38, the inner face of which is adapted for a fixed connection with a brake drum 40. The outside face of the flange may be designed for attachment to a disc wheel plate 42 having an annular flange portion 44 at its outer perimeter, said flange forming a supporting surface for a wheel rim 46, the latter being adapted to receive a conventional pneumatic tire 48.

The brake unit comprises the usual brake shoes 50 which may be provided with suitable lining 52 adapted to engage an internal braking surface presented by drum 40, said shoes and their associated parts being supported by and attached to cover plate 24 in any well known manner, not shown.

In Fig. 3 I have shown one modified construction wherein the knuckle member 12 is forked, instead of the axle tree as heretofore described, providing portions 54 adapted to receive the outer ends of a single knuckle pin 56, which in turn may be mounted in suitable bearings at the outer ends of said axle tree. It will be noted that the hub bearings 30 are positioned well outside the king pin axis in this case which affords a longer hub.

In Fig. 5 I have shown another modified form of my invention which comprises a reversed spindle member 58 and a pair of short king pins 60, the axes of which are substantially midway between the hub bearings 30. In this case the spindle 26 is a part of the hub 62 and rotates with the wheel.

In practice, the axle tree 8 may be tilted in the usual manner to obtain the desired amount of caster action without affecting the principle of my invention.

Referring to Figs. 1, 2, 3 and 5, the broken line B—B represents substantially, the vertical center of gravity plane with respect to the entire unit movable about the knuckle pin. The line B—B also represents the vertical center of gravity plane with respect to the rim 46 and tire 48; therefore these two members become self balanced regardless of their diameters.

Brake shoes 50, their supporting cover plate 24, and arm 16 are so designed and positioned as to balance disc 42 and hub 32 with its associated parts and it should be noted that the center of gravity of the dirigible unit as a whole, lies in a vertical plane common to the plane containing the king pin axis, said plane being substantially parallel with the plane of a wheel.

In Fig. 4 is shown a construction incorporating wheel cant and king pin slant. It will be clear that the principle of my invention is also applicable to this design.

While I have shown and described a disc type of wheel it will be clear, to those skilled in the art, that the principle involved herein is equally as well applicable to a wooden or wire spoked wheel. It will also be clear that the knuckle 12 may be connected to a chassis part other than an axle, as for example, to a bracket or directly to a spring.

I claim:

1. A vehicle dirigible unit comprising a wheel having a tire, a brake drum attached to said wheel, a steering knuckle, braking mechanism carried by the knuckle, means connecting said knuckle to a vehicle chassis, said means including a knuckle pin; said unit, comprising the wheel and knuckle with their associated parts which turn about the king pin as a common axis, having their combined masses so distributed that a horizontal line parallel with the direction of vehicle travel passing approximately through the center of gravity of the dirigible unit will intersect the axis of the king pin.

2. A vehicle dirigible unit comprising a wheel having a tire, a brake drum attached to said wheel, a steering knuckle, braking mechanism carried by the knuckle, means connecting said knuckle to a vehicle chassis, said means including a knuckle pin; said unit, comprising the wheel and knuckle with their associated parts which turn about the king pin as a common axis, having their combined masses so distributed that a horizontal line parallel with the direction of vehicle travel passing approximately through the center of gravity of the dirigible unit will intersect the axis of the king pin, said king pin axis being in the plane of the tire perimeter.

3. A vehicle dirigible unit comprising a wheel having a tire, a brake drum attached to said wheel, a steering knuckle, braking mechanism carried by the knuckle, means connecting said knuckle to a vehicle chassis, said means including a knuckle pin; said unit, comprising the wheel and knuckle with their associated parts which turn about the king pin as a common axis, having their combined masses so distributed that a horizontal line parallel with the direction of vehicle travel passing approximately through the center of gravity of the dirigible unit will intersect the axis of the king pin, said king pin being so positioned that a line passing through its axis will intersect the vertical diameter of the wheel tire substantially at the plane of a wheel supporting surface.

4. A vehicle dirigible unit comprising a wheel having a tire, a steering knuckle having a wheel spindle projecting therefrom, means connecting the steering knuckle to a vehicle chassis, said means including a knuckle pin; said unit comprising the wheel, the steering knuckle and their associated parts movable about said pin having their combined masses so distributed that the center of gravity thereof is in substantially the same wheel plane as the axis of said steering knuckle pin.

5. A vehicle dirigible unit comprising a wheel having a tire, a steering knuckle having a wheel spindle projecting therefrom, means connecting the steering knuckle to a vehicle chassis, said means including a knuckle pin; said unit comprising the wheel, the steering knuckle and their associated parts movable about said pin having their combined masses so distributed that the center of gravity thereof is in substantially the same wheel plane as the axis of said steering knuckle pin and the tire perimeter.

6. A vehicle steering unit comprising a wheel having a tire, a steering knuckle, a wheel spindle, bearings intermediate the wheel and spindle, a brake drum attached to said wheel, braking mechanism attached to said steering knuckle, means connecting the steering knuckle to a vehicle chassis, said means including a pivot member, said wheel and associated parts comprising a dirigible unit movable about said pivot member and having their combined masses so distributed that the center of gravity of said unit will lie in substantially the same wheel plane as the axis of said pivot member.

7. A vehicle steering unit comprising a wheel having a tire, a steering knuckle, a wheel spindle, bearings intermediate the wheel and spindle, a brake drum attached to said wheel, braking mechanism attached to said steering knuckle, means connecting the steering knuckle to a vehicle chassis, said means including a pivot member, said wheel and associated parts comprising a dirigible unit movable about said pivot member and having their combined masses so distributed that the center of gravity of the unit will lie in substantially the same wheel plane as the axis of said pivot member, said plane representing substantially the middle of tire tread.

8. A vehicle steering unit comprising a wheel having a tire and a hub, a spindle attached to said hub, a steering knuckle, means connecting the knuckle to a vehicle chassis, pivotal connecting means between the steering knuckle and the first mentioned means, the axis of said pivotal means being in a common wheel plane with the center of gravity of the mass movable about said axis as a pivot.

9. A vehicle steering unit comprising a wheel having a tire and a hub, a spindle attached to said hub, a steering knuckle, means connecting the knuckle to a vehicle chassis, pivotal connecting means between the steering knuckle and the first mentioned means, the axis of said pivotal means being in a common wheel plane with the center of gravity of the mass movable about said axis as a pivot, said wheel plane representing substantially the middle of tire tread.

10. The method of obtaining directional stability of a vehicle dirigible unit which consists of determining the center of gravity of the mass comprising all parts movable about a knuckle pin axis providing a knuckle pin about which said unit is adapted to oscillate, and positioning the pin so that its axis will be in substantially the same vertical wheel plane with said center of gravity.

11. The method of obtaining directional stability of a vehicle steering unit having a wheel tire, which consists of determining the center of gravity of the mass comprising all parts movable about a knuckle pin axis, providing a pivot member about which said unit is adapted to oscillate, and positioning said pivot member so that its axis will be in substantially the same vertical plane with said center of gravity, said plane representing substantially the middle of tire tread.

12. The method of obtaining directional stability of a vehicle dirigible unit having a supporting wheel which consists of determining the center of gravity of the entire dirigible unit movable about a knuckle pin, providing a knuckle pin about which the unit is adapted to oscillate, and positioning the knuckle pin so that a horizontal line parallel with the wheel plane and passing through the center of gravity of the unit will intersect the axis of said knuckle pin.

13. A vehicle dirigible assembly comprising an axle tree, a plurality of steering knuckles pivotally connected to the axle tree, a plurality of vehicle wheels each adapted to support a steering knuckle, said pivotal connections comprising knuckle pins being so positioned that their axes are each in substantially the same vertical wheel plane as the center of gravity of the mass comprising the associated unit movable about each knuckle pin as an axis, and means connecting said knuckles whereby movement of either knuckle about its knuckle pin controls similar movement of another knuckle.

14. In combination, a vehicle dirigible unit comprising a wheel having a tire, a spindle, a steering knuckle, and a pivot member adapted to connect the steering knuckle to a vehicle chassis, said pivot member being positioned so that its axis lies in substantially the same vertical wheel plane that passes through the center of gravity of the mass movable about said pivot member as an axis.

JOHN FABIEN DUBY.